(12) United States Patent
Stanko et al.

(10) Patent No.: US 7,431,240 B1
(45) Date of Patent: Oct. 7, 2008

(54) HYBRID DEICING SYSTEM AND METHOD OF OPERATION

(75) Inventors: John Stanko, Redondo Beach, CA (US); Lowell Pearson, Hermosa Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 24 days.

(21) Appl. No.: 09/640,063

(22) Filed: Aug. 17, 2000

Related U.S. Application Data

(60) Division of application No. 09/507,404, filed on Feb. 18, 2000, now Pat. No. 6,293,498, which is a continuation of application No. 08/877,272, filed on Jun. 17, 1997, now Pat. No. 6,047,926.

(60) Provisional application No. 60/022,508, filed on Jun. 28, 1996.

(51) Int. Cl.
*B64D 15/00* (2006.01)

(52) U.S. Cl. .............. 244/134 C; 244/134 R; 239/722; 134/123

(58) Field of Classification Search .......... 244/134 C, 244/134 R; 239/722; 134/123
See application file for complete search history.

(56) References Cited

U.S. PATENT DOCUMENTS

| 1,868,468 | A | 7/1932 | Thompson |
| 1,943,062 | A | 1/1934 | Driscoll ................. 219/19 |
| 2,249,940 | A | 7/1941 | Bulloch ................. 244/134 |
| 2,312,187 | A | 2/1943 | Patterson ............... 20/40.5 |
| 2,390,093 | A | 12/1945 | Garrison ................ 244/134 |
| 2,406,473 | A | 8/1946 | Palmatier .............. 244/134 |
| 2,422,746 | A | 6/1947 | Patterson ............... 244/134 |
| 2,457,031 | A | 12/1948 | Campbell ............... 244/134 |
| 2,832,528 | A | 4/1958 | Spears .................. 230/132 |
| 2,938,509 | A | 5/1960 | Carbonero ............. 123/139 |

(Continued)

FOREIGN PATENT DOCUMENTS

DE 767 362 6/1952

(Continued)

OTHER PUBLICATIONS

Giroux, "Hot Air Blast System: An Alternative to Heated Glycol Deicing," (Jun. 12, 1997).

(Continued)

*Primary Examiner*—J. Woodrow Eldred
(74) *Attorney, Agent, or Firm*—Fitzpatrick, Cella, Harper & Scinto

(57) ABSTRACT

This invention overcome the disadvantage of the prior systems and produces a high velocity specially formed and constituted pressure aerodynamic stream for efficiently and effectively removing ice from an aircraft. The specially formed stream includes a stream within a stream, wherein a deicing fluid such a glycol is entrained within and encased by a surrounding jacket of entraining fluid such air. This deicing is now known as coaxial stream/stream within a stream deicing. The special nozzle allows the stream to maintain fluid separation over its flight path so that aircraft contact is made by to be known as coaxial stream/stream within a stream deicing. The coaxial stream/stream within a stream deicing is further enhanced by pressurizing the stream to deliver the stream as a high pressure high velocity stream to improved the aerodynamic sweeping action of the airstream.

53 Claims, 5 Drawing Sheets

U.S. PATENT DOCUMENTS

| | | | | |
|---|---|---|---|---|
| 3,086,713 | A | 4/1963 | Moldenhauer | 239/136 |
| 3,101,175 | A | 8/1963 | Brown, Jr. | 239/150 |
| 3,160,347 | A | 12/1964 | Ackley et al. | 239/159 |
| 3,243,123 | A | 3/1966 | Inghram et al. | 239/124 |
| 3,485,176 | A | 12/1969 | Telford et al. | 103/9 |
| 3,533,395 | A | 10/1970 | Yaste | 126/271.1 |
| 3,602,211 | A | 8/1971 | Charman | 126/271.2 |
| 3,612,075 | A | 10/1971 | Cook | 134/99 |
| 3,684,186 | A | 8/1972 | Helmrich | 239/400 |
| 3,770,062 | A | 11/1973 | Riggs | 169/24 |
| 3,777,983 | A | 12/1973 | Hibbins | 239/422 |
| 3,835,498 | A | 9/1974 | Arato | 15/21 E |
| 3,985,223 | A | 10/1976 | Forcella et al. | 198/479 |
| 4,007,793 | A | 2/1977 | Hux et al. | 169/25 |
| 4,032,090 | A | 6/1977 | Thornton-Trump | 244/134 C |
| 4,073,437 | A | 2/1978 | Thorton-Trump | 239/131 |
| 4,118,151 | A | 10/1978 | Murakami et al. | 417/223 |
| 4,191,348 | A | 3/1980 | Holwerda | 244/134 C |
| 4,221,339 | A | 9/1980 | Yoshikawa | 239/704 |
| 4,225,086 | A | 9/1980 | Sandell | 239/428 |
| 4,309,049 | A | 1/1982 | Chevallier | 285/18 |
| 4,333,607 | A | 6/1982 | Mueller et al. | 239/13 |
| 4,378,755 | A | 4/1983 | Magnusson et al. | 118/684 |
| 4,423,980 | A * | 1/1984 | Warnock | 404/83 |
| 4,488,447 | A * | 12/1984 | Gebhardt | 74/397 |
| 4,565,321 | A | 1/1986 | Vestergaard | 239/172 |
| 4,634,084 | A | 1/1987 | Magnusson | 244/134 C |
| 4,652,025 | A | 3/1987 | Conroy, Sr. | 285/114 |
| 4,723,733 | A | 2/1988 | McClinchy | 244/134 C |
| 4,741,499 | A | 5/1988 | Rudolph et al. | 244/134 B |
| 4,826,107 | A | 5/1989 | Thornton-Trump | 244/134 R |
| 4,842,005 | A | 6/1989 | Hope et al. | 137/101.19 |
| 4,872,501 | A | 10/1989 | Hightower | 165/1 |
| 4,915,300 | A | 4/1990 | Ryan | 239/9 |
| 4,932,121 | A | 6/1990 | Jestädt et al. | 30/34.1 |
| 4,986,497 | A | 1/1991 | Susko | 244/134 C |
| 5,028,017 | A | 7/1991 | Simmons et al. | 244/134 C |
| 5,096,145 | A | 3/1992 | Phillips et al. | 244/134 R |
| 5,104,068 | A | 4/1992 | Krilla et al. | 244/134 R |
| 5,134,266 | A * | 7/1992 | Peppard | 219/687 |
| 5,134,380 | A | 7/1992 | Jonas | 324/674 |
| 5,165,606 | A | 11/1992 | Pelet | 239/427.3 |
| 5,180,122 | A | 1/1993 | Christian et al. | 244/134 F |
| 5,224,168 | A * | 6/1993 | Martinez et al. | 381/71.8 |
| 5,244,168 | A | 9/1993 | Williams | 244/134 R |
| 5,282,590 | A | 2/1994 | Zwick | 244/134 C |
| 5,318,254 | A * | 6/1994 | Shaw et al. | 244/134 C |
| 5,337,961 | A | 8/1994 | Brambani et al. | 239/397.5 |
| 5,454,532 | A | 10/1995 | Whitmire | 244/134 R |
| 5,490,646 | A | 2/1996 | Shaw et al. | 244/134 C |
| 5,520,331 | A | 5/1996 | Wolfe | 239/8 |
| 5,549,246 | A | 8/1996 | Kukesh | 239/9 |
| 5,632,072 | A | 5/1997 | Simon et al. | 26/69 R |
| 5,730,806 | A | 3/1998 | Caimi et al. | 134/22.12 |
| 5,746,396 | A | 5/1998 | Thorton-Trump | 244/134 R |
| 5,755,404 | A | 5/1998 | Numbers | 244/134 C |
| 5,779,158 | A | 7/1998 | Baker | 239/419.5 |
| 5,785,721 | A | 7/1998 | Brooker | 48/86 R |
| 6,029,934 | A | 2/2000 | Foster | 244/134 C |
| 6,045,092 | A | 4/2000 | Foster | 244/134 C |
| 6,047,926 | A | 4/2000 | Stanko et al. | 244/134 R |
| 6,209,823 | B1 | 4/2001 | Foster | 244/134 C |
| 6,250,588 | B1 | 6/2001 | Numbers et al. | 244/134 C |
| 6,547,187 | B2 | 4/2003 | Foster | 244/134 C |
| 2002/0030141 | A1 | 3/2002 | Foster | 244/134 R |

FOREIGN PATENT DOCUMENTS

| | | |
|---|---|---|
| DE | 1 266 137 | 4/1968 |
| DE | 2 343 389 | 3/1974 |
| DE | 195 22 881 | 11/1996 |
| EP | 0 298 779 | 1/1989 |
| FR | 1149351 | 12/1957 |
| GB | 822 811 | 11/1959 |

OTHER PUBLICATIONS

"Allied Signal's Augmented Forced-Air Deicing (AFAD)," Allied Signal Aerospace (Oct. 22, 1996).
Final Program, SAE Aircraft Ground Deicing Conference & Exposition, Jun. 11-13, 1997.
Reexamination Control No. 90/005,860.
Reexamination Control No. 90/005,863.
"USAF works with forced air de-icing", "FMC launches new . . . ", "Vestergaard's Elephants gain new features", and "Fixed systems put down roots".

* cited by examiner

HYBRID DEICING SYSTEM AND METHOD OF OPERATION

RELATED APPLICATION

This application claims the benefit of and priority to earlier filed U.S. provisional application for a Glycol Air Deicing System Ser. No. 60/022,508 filed Jun. 17, 1996.

FIELD OF INVENTION

This invention is related to system for deicing aircraft and more particularly to a glycol/air coaxial stream deicing system wherein glycol and forced air are applied as a specially formed glycol stream within a forced air stream. The special stream is charged to hydronamically dislodge and remove ice or other frozen deposits from the aircraft.

BACKGROUND

Prior forced air deicing systems inject the glycol in an air stream air causing the glycol to atomized and dispersed in the air. Such streams lack the cleaning capacity to dislodge and remove ice from aircraft wings.

Conventional aircraft deicing systems consist of ground or truck mounted spray systems which apply hot (180° F.) deicing fluid (a mixture of glycol and water) at rates up to 60 gpm to the aircraft surfaces. This thermal process is very effective in quickly melting the snow or ice from these surfaces, i.e. wings, etc. However, glycol is expensive and toxic creating significant economic and waste management problems for airline and airport operators. The life cycle cost of deicing glycol (i.e. Type I ethylene or propylene glycol) includes costs associated with its buying, storing, handling, heating, applying, collecting and reprocessing or disposal. Various deicing systems using little or no glycol have been tried and to date these systems have demonstrated limited effectiveness. Therefore, they have not gained acceptance by commercial deicing operators.

Ground deicing of aircraft is an important step in preparing aircraft for safe flight during snow, ice and frost weather conditions. Accumulation of these winter products on aircraft surfaces (wings, tail and rudder) disturbs the aerodynamic performance of these-surfaces creating unstable flight conditions. While conventional hot deicing fluid washdown of aircraft is very effective in removing these accumulations, glycol is expensive and toxic. Furthermore, the deicing process takes time which causes flight delays during the winter months. This combination of cost, waste management and flight delays creates a significant economic burden for the airlines during winter operations. Therefore, a deicing process that is efficient, i.e. sharply reduces glycol usage and deicing cycle time, is in high demand by the airline industry.

Conventional aircraft deicing by hot deicing fluid (Type I) washdown from ground or mobile boom systems has been in use for decades with no basic changes to this technology other than refinements to the deicing fluid heating and application systems. Some of the patents covering conventional deicing and its refinements are as follows: 1) U.S. Pat. No. 3,243,123, to D. M. Ingraham, et. al., issued Mar. 29, 1966; U.S. Pat. No. 4,073,437 Thornton-Trump, issued Feb. 14, 1978; U.S. Pat. No. 4,826,107 to Thornton-Trump, issued May 2, 1989 and U.S. Pat. No. 5,028,017, to Simmons, et al., issued Jul. 2, 1991. Other publications describe various deicing systems, (some of which are believed to have been tested) to improve the deicing process, either by reducing or eliminating the use of glycol, or by applying glycol in a more efficient manner such that the glycol usage is reduced for instance: U.S. Pat. No. 5,244,168 to Williams, issued Sep. 14, 1993 for A Methodology And Apparatus For Forced Air Aircraft Deicing and U.S. Pat. No. 5,104,068 to Krilla et al., issued Apr. 14, 1992

Forced air deicing ("hot air blasts) has been used by the US Air Force for decades. At Air Force bases such as Elmendorf in Alaska, operators use deicing trucks that have an add-on forced air system. Landoll is one company that modifies deicer trucks with forced air add-on for Air Force use. These Landoll add-on systems, use air from a Garrett (now Allied-Signal) APU that is plumbed to a second (non gylcol carrying) nozzle located along with the conventional deicing fluid nozzle(s) at a boom basket. Forced air is used to remove much of the snow from military aircraft followed by conventional fluid deicing. This process, which extends deicing cycle time, is viable for the Air Force because they are typically not constrained by strict time schedules, like commercial airlines, and glycol usage is reduced.

Deicing fluid entrained in air has been know for a number of years, see for instance U.S. Pat. No. 2,482,720 Prevention of Ice Formation in Air Intakes on Aircraft and Other Fast Moving Vehicles," U.S. Pat. No. 2,482,720 (1949) and Palmatier, "Fan Deicing or Anti-Icing Means", U.S. Pat. No. 2,406,473 (1946).

Referring now to FIG. 1, that shows an illustration of prior art forced air deicing system of the type disclosed in U.S. Pat. No. 5,244,168, that injects glycol A at right angles to the primary flow axis of an airstream B, generally producing what is described in that patent as "a well-dispersed atomized spray pattern" (col 7 line 35) or a "spray pattern of a high speed colloidal suspension of deicing fluid in air" (claim 1, lines 21-22). This patent also requires the uses of a "plurality of sources of deicing fluid." (see col 2, line 34 col line 32).

Various airline operators have indicated glycol injected at right angle to the primary axis of the airstream, as is shown in FIG. 1, reduces the effectiveness of forced air deicing. The glycol mixes and atomizes in the airstream. The energy transfer process associated with the mixing and atomizing reduces the kinetic energy of the airstream which reduces the effectiveness of the air stream/glycol mixture to dislodge snow and ice that is frozen to or adhered to an aircraft. Thus, this atomization process reduces the effectiveness of the airstream in breaking loose snow and ice that is frozen to or adhered to an aircraft surface and also reduces the effectiveness of the airstream in moving heavy, wet snow. In addition, the mixture of atomized glycol and high velocity air adds more wetness to the snow further inhibiting the removal of wet snow.

Another novel deicing technique developed by InfraTek Radiant Energy Corporation uses gas-fired infra-red heaters built into the interior structure of a large prefab type hangar to melt ice from the aircraft surfaces. Two fundamental problems have surfaced with this deicing process. First, the frequency of the infra red heaters is such that snow melts slowly extending the deicing cycle time. Second, testing to date shows that melting ice from the upper surfaces of the aircraft often re-freezes on the lower surfaces not exposed to the infra-red rays.

U.S. Pat. No. 5,104,068 Krilla et al. describes an apparatus for both de-icing and anti-icing an aircraft in one "pass". The apparatus consists of articulated booms on each side of the aircraft to be processed. These booms are such that they extend over the entire length of each wing and each has two series of nozzles. One set is for dispensing a deicing fluid mixture and the other set of nozzles dispenses anti-icing fluid. There is also a set of booms underneath the aircraft for processing the lower aircraft surfaces. The patent also describes the use of different mixtures of pressurized air, water and glycol (Type I) with the mixture varied in accordance with the particular weather conditions. The apparatus and process described above are commercially known by the name "Whisper Wash" expected to be field demonstrated during the winter of 1996-7. Benefits expected to be realized presumably include, reduced glycol usage and reduced de-ice/anti-ice cycle time.

SUMMARY OF THE INVENTION

This invention overcomes the disadvantage of the prior systems and provides a new hybrid deicing system that produces high velocity specially formed coaxial stream of Type I glycol or Type I glycol and water and air for efficiently and effectively removing ice from an aircraft. This invention ("hybrid deicing"), utilizing two fluid flow technologies and a unique coaxial nozzle, yields an efficient, stand-alone deicing system, i.e. a complete deicing system that reduces glycol usage and deicing cycle time. The new process consists of an inner high velocity stream of glycol surrounded by an outer stream of high velocity air. These two independent, coaxial streams work in concert to deuce the aircraft surfaces. Laboratory tests have validated that "hybrid deicing" can quickly and safely remove snow and ice frozen to a simulated aircraft surface. These tests indicate that deicing glycol usage can be reduced to 10% or less relative to conventional usage thereby providing the deicing operator with significant economic and waste management benefits. It is estimated hybrid deicing will reduce conventional deicing cycle time, in many deicing situations, by 10% or more providing an additional benefit to the operator. The specially formed stream includes a stream within a stream, wherein a deicing fluid such as glycol is entrained within and encased by a surrounding jacket of entraining fluid such air. Therefore the unique coaxial nozzle produces two essentially independent stream of Type I glycol fluid and air, both stream exiting the nozzle at high and substantially equal velocities in the range of 600-800 mph. The precise velocity of the streams depends on the upstream pressures and temperatures of the fluids.

This combination of high velocity coaxial stream within a stream of air and glycol hydrodynamically and thermally removes adhered ice, all types of freezing rain and snow. Further the surrounding sheath of forced air reduces the fluid energy and momentum loss of the inner deicing fluid and increases the effective snow/ice removal range (distance from the exit) of the combined streams.

This invention, utilizing high pressure glycol that is coaxially injected into a high velocity airstream, will de-ice aircraft as effectively as the conventional hot glycol wash method but with glycol application rates reduced to 10% or less of conventional rates. Consequently, this new deicing system significantly reduces conventional deicing costs and the impact on the environment.

This combination of high velocity coaxial stream within a stream of air and glycol hydrodynamically and thermally remove adhere ice, and light, wet and heavy snow.

This invention, utilizing high pressure glycol that is coaxially injected into a high velocity airstream and or stream within a stream high pressured injection, will de-ice aircraft as effectively as the conventional hot glycol wash method but with glycol application rates reduced to 10% or less of conventional rates. Consequently, this new deicing system significantly reduces conventional deicing costs and the impact on the environment.

BRIEF DESCRIPTION OF THE DRAWINGS

The invention will become more readily apparent from the following description of preferred embodiments thereof, illustrated, by way of examples, in the accompanying drawings, in which.

DETAILED DESCRIPTION OF PREFERRED EMBODIMENTS

Figure 1:
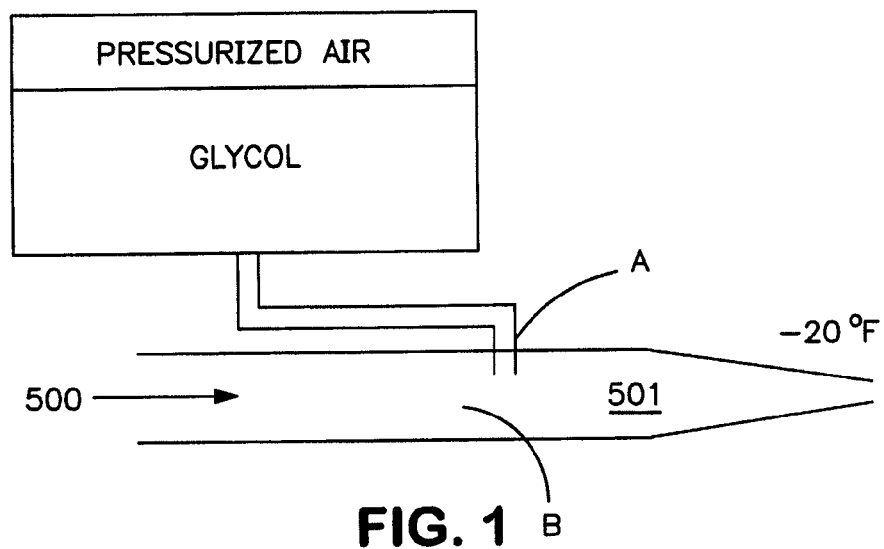
FIG. 1 is a cross sectional illustration of a prior glycol forced air deicing system showing glycol injection at a right angle to the air stream.
Figure 2:
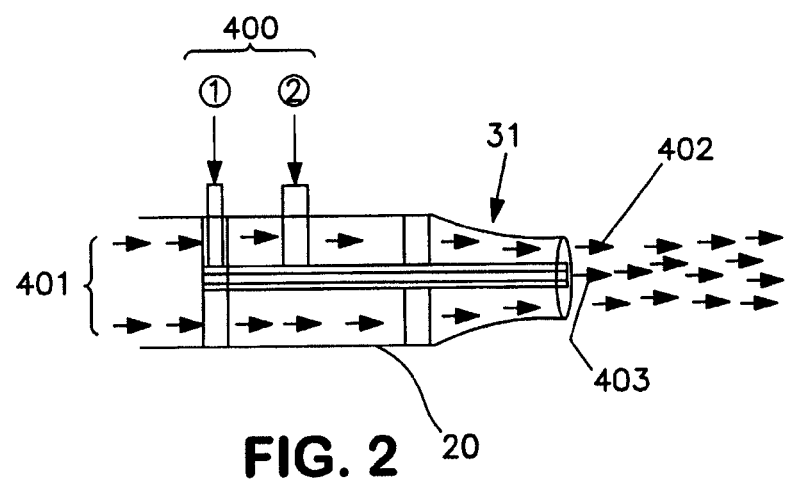
FIG. 2 is an illustration of glycol forced air deicing system in accordance with the present invention showing coaxial glycol injection

In FIG. 1, reference numeral 500 represents 400° F. air; 501 represents 50-200 mph. Referring now to FIG. 2, the new stand-alone ground based hybrid deicing system 10 of the present invention, (shown in detail in FIG. 7), utilizes a specially constructed coaxial nozzle assembly 20 that simultaneously delivers two independent, high velocity deicing streams. Preferably, a deicing fluid stream is encased within a high velocity airstream. The nozzle preferably has a special 0.060 inch diameter jetting orifice that produces a conical shaped jet. (in FIG. 2, reference numeral 400 represents heated deicing fluid from the triplex pump; 401 represents pressurized air from the centrifugal compressor (100 Lb per min); 402 represents 800 mph airstream; 403 represents 800 mph deicing fluid stream (high pressure/low flow mode); and 31 represents ASME "long radius" nozzle.)

The coaxial nozzle assembly 20 is specially designed to meld two fluid flow technologies, conversion of subsonic airflow to sonic or near sonic airflow and high pressure liquid jetting to create two independent streams that are effective for deicing aircraft. Coaxial nozzle assembly has two concentric pipes along the centerline of the assembly with low and high flow deicing fluid nozzles and a converging/diverging air nozzle.

The coaxial nozzle assembly 20 comprises three concentric cylinders 22, 24, and 26 and three nozzle 32, 34 and 36. This cylindrical arrangement provides two different flow passages for the deicing fluid and a single passage for the forced air. The outer cylinder 22, with a 3.5 inch internal diameter, has a converging/diverging nozzle 32 at one end 38 where pressurized air 40 exits. Along the centerline of this cylindrical air nozzle 20 are two concentric pipes 24 and 26. The inner pipe 26 delivers high pressure (up to 7000 psi) deicing fluid 42 at approximately 6 gpm to a special fluid jetting nozzle 36 which produces a high velocity deicing fluid jet 44. The inside of the outer pipe 22 and outside of the inner pipe 26 form an annular passage 24 for low pressure deicing fluid in the pressure range of 150-300 psi. The low pressure deicing fluid preferably exits the coaxial nozzle 20 through an annular array of orifices 34 at approximately 20 gpm. The exits of the inner nozzles 34 and 36 are flush with exit of the air nozzle 32.

A key feature of the coaxial nozzle is the compatibility of the exit fluid streams. Pressurized air 40 from a centrifugal compressor (FIG. 7) enters the coaxial nozzle 20 at approximately 100 lb. per minute (ppm). This air 40 exits the coaxial nozzle 20 through the annular region formed by the convergent/divergent nozzle 32 (ASME "long radius" nozzle) and the outer deicing fluid pipe 24.

The ASME nozzle 32 accelerates the air 40 to sonic or near sonic velocity with minimal energy loss. In the low flow mode, high pressure (7000 psi) deicing fluid flows through the inner pipe 26 and exits through a special fluid jetting nozzle 36 in a solid conical pattern. The coaxial nozzle is selected based on the inlet pressures of the air 40 and deicing fluid 42 (high pressure low flow mode) to achieve equal exit velocities of approximately 600-800 mph for both fluids.

Under most deicing conditions, the maximum flow rate of the deicing fluid 42/44 is only 6 gallons per minute (gpm) relative to conventional deicing with flow rates of 60 gpm or more. Since, in the hybrid deicing process, the deicing fluid stream can be, turned "on" or "off" abruptly by the deicing operator, glycol consumption is further reduced. For example, the deicing operator turns "off" the deicing fluid when removing dry or near dry powder snow that is not adhered to the aircraft surface. After deicing under these conditions, the operator can turn "on" the deicing fluid to apply a final overspray of fluid for providing anti-icing holdover time prior to takeoff.

The purpose of the low pressure, high flow deicing fluid feature is to address the fairly infrequent but severe icing conditions that result in the formation of ¼ inch or more of hard ice frozen to the aircraft surfaces. Under these conditions, a deicing process similar to conventional deicing (hot deicing fluid washdown) must be employed, i.e. thermal removal of the ice. The high-velocity air flowing around this lower velocity inner stream assists in the snow removal process and also blows away the steam that forms. Therefore, the airstream has an added benefit of helping the operator to better see what he is doing. For hard, thick ice an operator switches the remote valves to direct the deicing fluid to the outer annual flow passage and the annular orifice array. The high pressure pump is sped up so that the deicing fluid delivery is increased from 6 gpm to 20 gpm. Since the deicing fluid now flows through a much larger orifice are, pressure in the annular flow passage drops to 150-300 psi, hence the low pressure high flow mode of operation Therefore, the hybrid deicing process is adjustable on the spot to the specific deicing conditions encountered and all deicing conditions can be efficiently addressed. This adjustment capability maximizes effectiveness of the process and is consistent with the goal of this invention to minimize glycol consumption and waste management. FIG. 2 below shows the front view of the coaxial nozzle exit and the deicing fluid exit points for the two modes of operation using deicing fluid. A third mode of operation uses air only.

Figure 3:
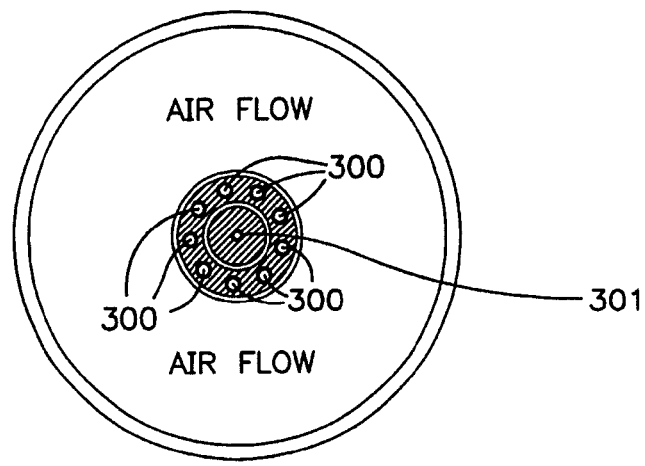
FIG. 3 is an illustration of an exit coaxial nozzle in accordance with the present invention showing coaxial glycol injection

FIG. 3 is an illustration of a front view of a coaxial nozzle exit in accordance with the present invention. For most deicing conditions, high pressure low flow deicing fluid is jetted from the center orifice 36 in a conical spray pattern. For hard, thick ice removal, low velocity high flow deicing fluid flows through the annular orifices at a rate of approximately 20 gpm. In both cases, the inner deicing fluid stream 42 is surrounded by a high velocity outer airstream 40. (Reference numeral 300 represents hard ice removal-high flow (20 gpm), low pressure deicing fluid flows through these annular orifices; 301 represents most deicing conditions-low flow (6 gpm), high pressure deicing fluid flows through this 0.060 inch diameter orifice.)

Figure 4:
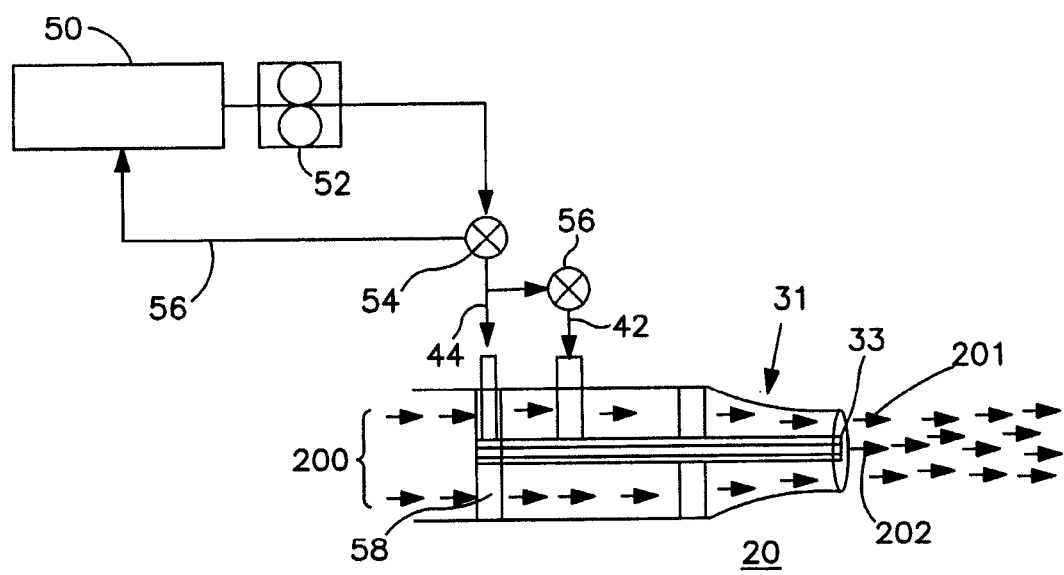
FIG. 4 is an illustration of schematic block diagram of a simplified glycol forced air deicing system in accordance with the present invention showing coaxial glycol injection

FIG. 4 is an illustration of schematic block diagram of a simplified glycol forced air deicing system 10 including deicing fluid tank 50 (heated deicing fluid (Type 1)) coupled to a high pressure pump 52 (variable speed: (1) 6 GPM MAX @ 7000 PSI (high pressure/low flow mode (most deicing conditions)); or (2) 20 GPM MAX @ 300 PSI (low pressure/high flow mode (hard thick ice)). A three way selector valve 54 (3-way selector valve for switching deicing fluid stream on/off) is coupled to the pump 52 to feedback deicer fluid to the tank 50 through return line 55 or to direct deicing fluids 42 and 44 to the nozzle 20. A diverter valve 56 (on/off valve turned on for high flow, low pressure) is connected between the three way valve 54 and the outer fluid nozzle 44 so that when the diverter valve 56 is open a high volume of low pressure deicing fluid 42/44 flows to the nozzles 32 and 34. (In FIG. 4, reference numeral 200 represents pressurized air from shaft-driven compressor (100 Lb per min); 201 represents 800 MPH airstream; 202 represents 800 MPH deicing fluid stream (high pressure/low flow model).

The variable speed system 10 can be used for low flow or high flow operation in which high pressure deicing fluid coaxial to the airstream producing independent streams of fluids that work in concert and are effective in removing wet snow or snow ice that has adhered to the aircraft surfaces.

A coaxial nozzle assembly 20 can be constructed from 3.5 inch diameter stainless steel 30 tubing with a converging/diverging ASME "long radius" nozzle 31 attached to one end. A 24 inch long stainless steel pipe 32, 0.75 inch in diameter, was supported from struts 58 along the centerline of the larger tube 32. A high pressure jetting nozzle assembly 33 can be screwed into the end of this pipe 32. The nozzle assembly 33 can include a carbide nozzle insert 64 that can be changed to alter the deicing fluid jet pattern for example from fan to solid cone with various dispersion angles.

A system in accordance with this schematic having a coaxial nozzle 20 and the remote controlled valves 54 and 56 allows an operator of the deicing system to continuously adjust between all three deicing fluid modes or to select one of three deicing fluid flow modes: i) Low flow (6 gpm) for most deicing conditions, ii) High flow (20 gpm) for hard ice removal or iii) Flow "off" for air only removal; deicing fluid is bypassed back to deicing fluid tank.

Figure 5:
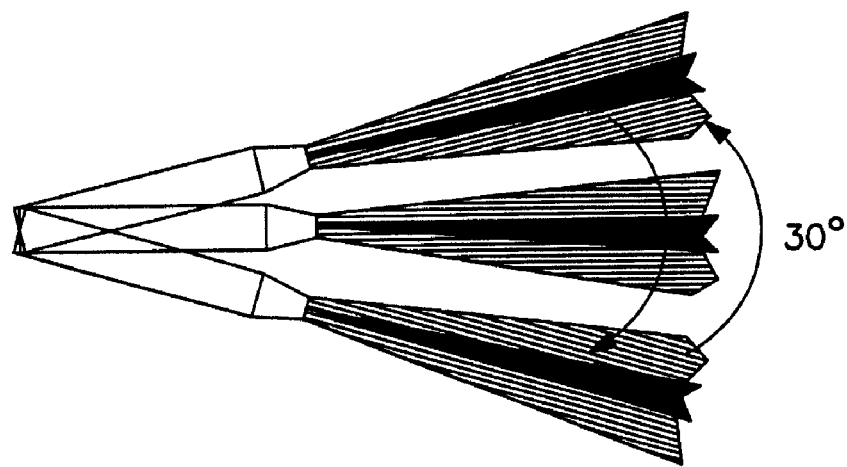
FIG. 5 is an illustration of the sweeping action found to be effective in the use of the present invention.
Figure 8:
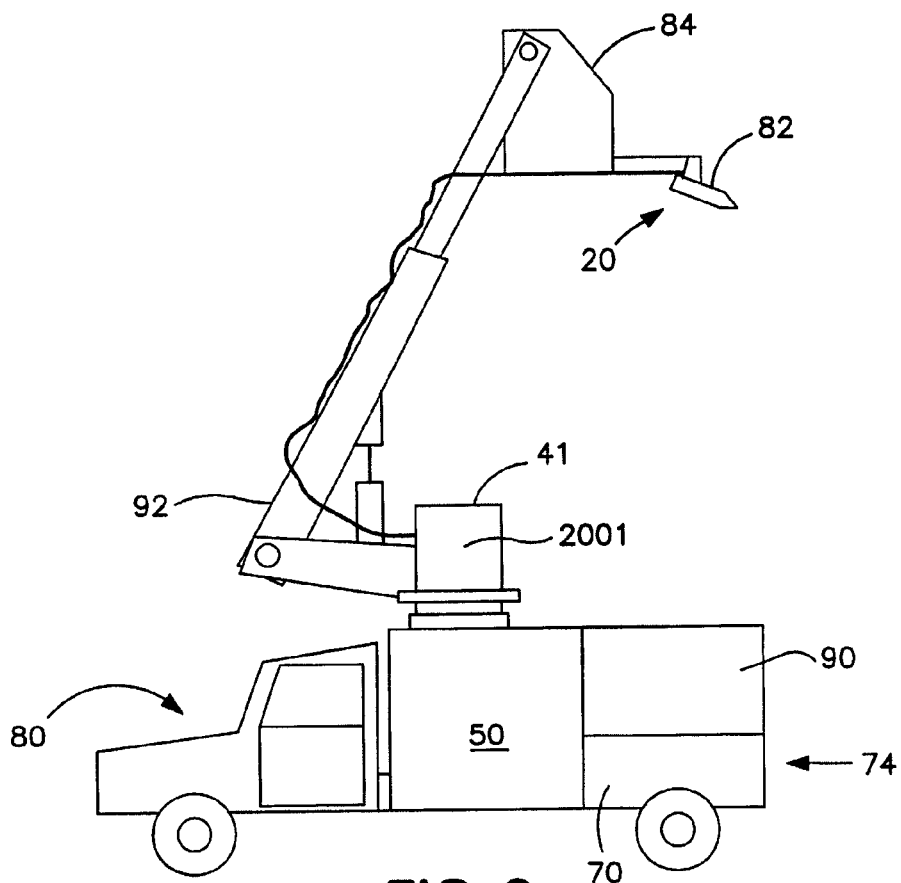
FIG. 8 is an illustration of a truck mounted hybrid forced air deicing system in accordance with the present invention.

FIG. 5 is an illustration of the sweeping action found to be effective in the use of the present invention and shows the coaxial nozzle swinging motion found to be the most effective for removing ice. In an actual working system, the coaxial nozzle swinging motion, using an automatic actuation system 74, can be activated when the deicing fluid 42/44 is called for by for instance depressing level of the deicing gun (FIG. 8).

Figure 6A:
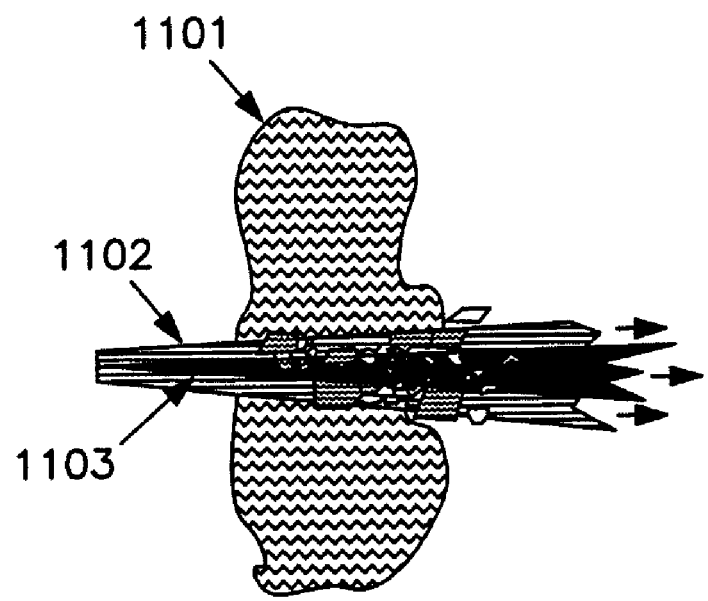
FIGS. 6a and 6b are illustrations of the frozen snow removal process in accordance with the present invention
Figure 6B:
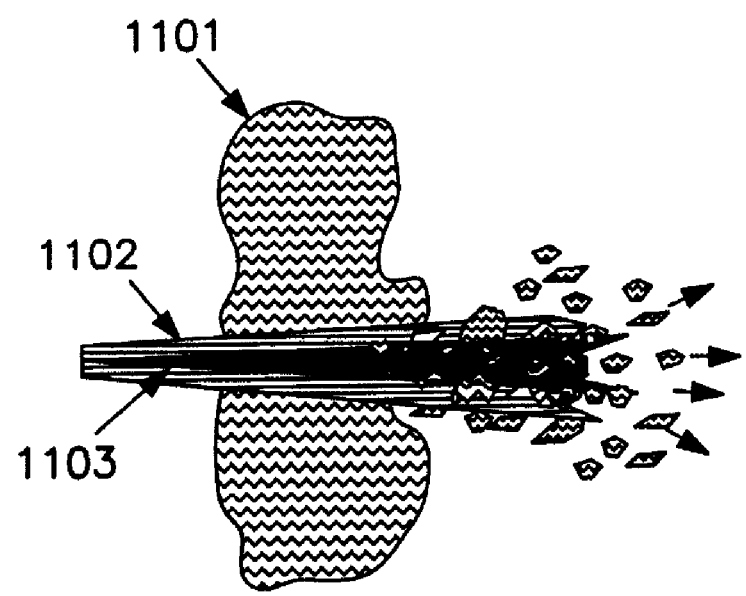

FIGS. 6a and 6b are illustrations of the frozen snow removal process in accordance with the present invention. In FIG. 6a frozen snow is removed by the concentrated energy of the inner deicing fluid stream. In FIG. 6b, both streams work in concert to sweep away the loosened frozen snow. (In both figures, reference numeral 1101 represents snow frozen to test surface; 1102 represents air stream; and 1103 represents deicing fluid stream; also, FIG. 6a shows a frozen snow removal process, where the concentrated energy of the inner deicing fluid stream breaks loose the frozen snow; and FIG.

6b shows a frozen snow removal process, where both fluid streams work in concert to sweep away the loosened frozen snow.)

Figure 7:
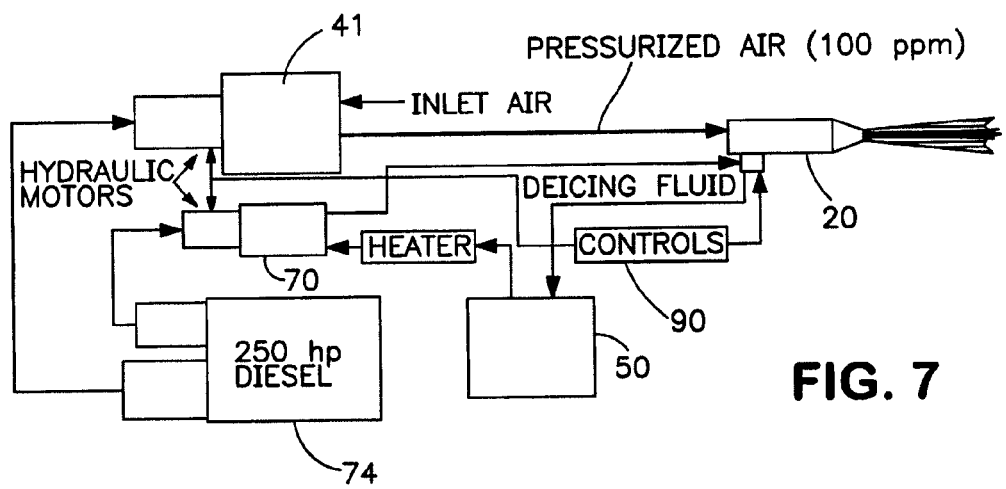
FIG. 7 is an illustration of a hybrid glycol forced air deicing system in accordance with the present invention.

FIG. 7 is an illustration of a hybrid glycol forced air deicing system 10 in accordance with the present invention. A key element of the hybrid deicing system 10 is the compact air source 41, such as a gear driven centrifugal compressor 41 (centrifugal air compressor), manufactured by AlliedSignal as a model P3X compressor. This compressor 41 is unique because of its very high power density, i.e., its high horsepower to low weight ratio. A high speed radial bladed impeller in this compressor produces pressurized air at 100 ppm at a maximum pressure of 29 psig for sea level operation. These characteristics of the compressor are necessary to provide the air flow rate and discharge pressure at high altitude airports such as Denver International, as well as sea level airports, for effective hybrid deicing. The compactness of the machine allows it to be installed at the base of deicing booms to minimize air handling problems associated with air delivery through large diameter hose and pipe.

High pressure deicing fluid 42/44 is produced by a triplex type positive displacement variable speed pump 70 which has sufficient capacity to pump both low flow (6 gpm), high pressure (7000 psi) and high flow (20 gpm), low pressure (300 psi) deicing fluid. The triplex pump 70 used in the hybrid deicing system has been customized to operate over this wide pressure and flow operating range.

Figure 9:
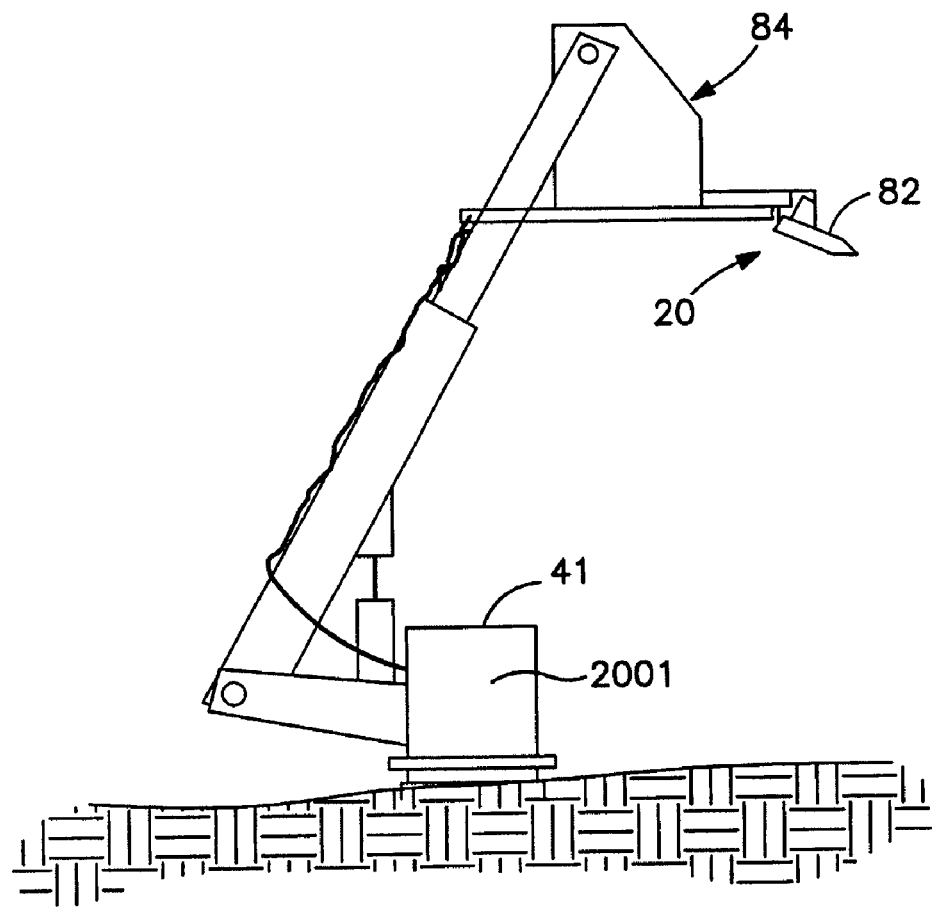
FIG. 9 is an illustration of a stationary boom that can be used with the hybrid forced air deicing system in accordance with the present invention.

FIG. 8 is an illustration of a truck mounted forced air deicing system in accordance with the present invention. (This is a deicer truck with hybrid deicing system; the compactness of the air compressor allows it to be located at the base of the deicing boom; reference numeral 2001 in this figure and in FIG. 9 represents the air compressor enclosure.) FIG. 8 below shows a deicer truck 80 with a hybrid deicing system 10 installed. The equipment shown in this schematic would typically be installed in a deicer truck having a boom 92 (FIG. 8) or a ground mounted boom system 99 (FIG. 9) such as the Ice Hawk system located at the Pittsburgh Airport. A deicing gun 82 including the coaxial nozzle is located at the boom basket 84 and the air compressor 41 is mounted at the base of the boom 80. The air compressor 41 and triplex pump 70 can be hydraulically driven with a diesel (or gasoline) engine 74 as the ultimate power source. A control system 90 directly associated with the deicing process controls the deicing fluid valves (low flow, high flow or "off") and the speeds of the triplex pump 70 and compressor.

This simple sketch illustrates an important feature of the system 10, namely the location of the compact air source 41 (the gear driven centrifugal compressor) at the base of the deicing boom 82. This location minimizes air handling problems associated with air delivery through large diameter hose and pipe. A Type II antiicing system for gel coating cleaned aircraft, can also be included on the deicing trucks with the hybrid system 10.

Another feature of hybrid deicing, resulting from its reduced deicing fluid usage, is the greater on station availability of the hybrid deicer truck. Typically, a deicer truck 80 has a 2000 gallon Type I deicing fluid tank that is refilled at the airline's maintenance facility usually far removed from where deicing is done, i.e. at the gate or near the takeoff area. Due to its low usage of deicing fluid, a hybrid deicer truck can deice about 10 times the number of aircraft that a convention deicing truck can deice.

Conventional aircraft ground deicing systems consist of ground or truck mounted spray systems which apply hot (180.F) deicing fluid (a mixture of glycol and water) at rates up to 60 gpm to the aircraft surfaces. This thermal process is very effective in quickly melting the snow or ice from these surfaces, i.e. wings, etc. However, glycol is expensive and toxic creating significant economic and waste management problems for airline and airport operators. This invention addresses a lab-tested, stand-alone hybrid deicing system built around a coaxial nozzle. An independent, high energy, low flow deicing fluid stream within a high velocity airstream does much of the work to break loose ice and frozen snow from aircraft surfaces or to move heavy, wet snow. A significant savings to airline operators in reduced glycol usage, greater on station availability of deicer trucks, and reduced waste management problems are the benefits of this new hybrid deicing process.

In operation it has been determined that the combination of compatible high velocity coaxial streams of air and heated deicing fluid can be used to hydrodynamically and thermally remove adhered ice/snow and heavy, wet snow. a deicing fluid (glycol/water mixture) can be heated and injected in the center of the airstream through a special 0.060 inch diameter jetting orifice at pressures up to 7,000 psi creating a conical shaped inner fluid stream of high velocity fluid which quickly penetrates and breaks loose ice and snow frozen to the aircraft surfaces. The concentrated force of this high velocity fluid stream is very effective in moving heavy, wet snow. The outer sheath of high velocity air then works in concert with the inner stream of deicing fluid to hydrodynamically sweep away the ice and snow.

Increased aerodynamic sweeping action of the high velocity airstream is achieved by adding to it an inner stream within a stream, either and or by adding to it a high velocity coaxial stream of hot air glycol, or water dilute hot glycol. This combination of inner stream within a stream and or of high velocity coaxial streams of air and glycol hydronomically and thermally remove adhere ice, wet, light and heavy snow. The glycol is injected in the center of the airstream through a 0.060 inch diameter nozzle orifice at pressures up to 7,000 psi creating a dense and or highly condensed inner core of high velocity fluid which quickly penetrates and breaks loose ice and snow frozen to the aircraft surfaces. The outer sheath of high velocity coaxial stream and or stream within a stream then works in concert with the inner stream of glycol to hydronimically sweep away the ice and snow. Since the maximum flow rate of the glycol is only 6 gallons per minute (gpm) and the glycol stream can abruptly turned on or off by the deicing operator, glycol consumption is greatly reduced relatively to glycol consumption for conventional deicing. The deicing operator turns on the glycol stream only when required by the deicing conditions, i.e. localized patches adhered ice/snow. Also, the operator can apply a final overspray of glycol after deicing, a conventional practice, for providing anti-icing prior to takeoff.

In summary, the hybrid forced air/glycol deicing is a that produces coaxial stream of high velocity air and glycol either and or high velocity stream within a stream that in combination have momentum and kinetic energy that are at least 50% higher than these same characteristics for the prior art fluid "spray pattern". The prior art injects glycol transverse to the fluid "spray pattern" which does not change the momentum, but the kinetic energy is reduced. Fluid "stream within a stream" momentum is the primary mechanism for sweeping away loose snow and ice. Kinetic energy is the mechanism for breaking loose snow and ice that is frozen to the aircraft surfaces. Therefore, ample fluid "stream within a stream and or coaxial stream" momentum and kinetic energy are necessary to provide effective deicing under all weather and deicing conditions.

While the sketches, illustrations and detailed descriptions disclosed the particulars, general and specific attributes of the embodiment of the method, apparatus and systems of the invention, it should not be construed nor assumed by anyone and or those skilled in the art that it is not a form or aspects of limitation of the said and described invention. The details are a mere attempt, for the purpose of clarifications and to express ideas, to explain the principles, to aid and guide an individuals with expertise in the field to visualize the concepts of said invention. As a plurality of modifications and variations of the present invention are probable and possible taking into consideration the disclosure of the sketches, illustrations and detailed descriptions, it should be understood that the citing, teaching and referring to some and all equivalent elements or combinations for achieving substantially the same results may be practiced otherwise than as uniquely and precisely explicated and described.

What is claimed is:

1. A system for deicing, comprising:
   a vehicle;
   a boom having an end mounted on said vehicle and a free end;
   a lightweight air source disposed at the base of said boom; and
   a deicer air jet nozzle located at said boom and operatively coupled to said air source for receiving air and discharging the air for a deicer application,
   wherein said air source is disposed above a roof of the vehicle, and
   wherein a power source for said air source is disposed below the roof of the vehicle.

2. The system according to claim 1, wherein said lightweight air source is a compressor unit comprising:
   a hydraulic drive assembly having an output; and
   a compressor operatively connected to the output of said hydraulic drive assembly, said compressor having an impeller and an air outlet.

3. The system according to claim 2, wherein said hydraulic drive assembly is a hydraulic motor.

4. The system according to claim 2, wherein said compressor is a centrifugal compressor.

5. The system according to claim 2, wherein said compressor is operatively directly connected to the output of said hydraulic drive assembly.

6. The system according to claim 2, wherein said compressor provides air through said deicer air jet nozzle at a rate of about 100 pounds per minute.

7. A system for deicing aircraft, comprising:
   a vehicle;
   a boom having a first end mounted on said vehicle and a free end;
   a lightweight compressor unit disposed at the first end of said boom; and
   a deicer air jet nozzle located at the boom and operatively coupled to said lightweight compressor unit for receiving air and discharging the air for a deicer application,
   wherein said lightweight compressor unit is disposed above a roof of the vehicle, and
   wherein a power source for said lightweight compressor unit is disposed below the roof of the vehicle.

8. A system for deicing aircraft, comprising:
   a vehicle;
   a boom having a first end mounted on said vehicle and a free end;
   a lightweight compressor unit disposed at the first end of said boom; and
   a deicer air jet nozzle located at the boom and operatively coupled to said lightweight compressor unit for receiving air and discharging the air for a deicer application,
   wherein said lightweight compressor unit further comprises (a) a hydraulic drive assembly having an output, and (b) a compressor operatively connected to the output of said high-speed drive assembly, said compressor having an impeller and an air outlet,
   wherein said lightweight compressor unit is disposed above a roof of the vehicle, and
   wherein a power source for said lightweight compressor unit is disposed below the roof of the vehicle.

9. The system according to claim 8, wherein said compressor is operatively directly connected to the output of said hydraulic drive assembly.

10. A system for deicing aircraft, comprising:
    a vehicle;
    a boom having an end mounted on said vehicle and a free end;
    an operator cab located at the free end of said boom;
    a lightweight compressor unit disposed at the base of said boom; and
    a deicer air jet nozzle located at said boom and operatively coupled to the air outlet of said compressor unit for receiving air and discharging the air for a deicer application,
    wherein said compressor unit is disposed above a roof of the vehicle, and
    wherein a power source for said compressor unit is disposed below the roof of the vehicle.

11. The system according to claim 10, wherein said compressor unit further comprises:
    a hydraulic drive assembly having an output; and
    a compressor operatively connected to the output of said hydraulic drive assembly, said compressor having an impeller and an air outlet.

12. The system according to claim 11, wherein said compressor is operatively directly connected to the output of said hydraulic drive assembly.

13. A system for deicing aircraft, comprising:
    a vehicle;
    a boom, having an end mounted on the vehicle and a free end;
    a compressor unit, said compressor unit comprising (a) a hydraulic motor having an output, and (b) a compressor operatively connected to the output of said hydraulic motor, said compressor having an impeller and an air outlet; and
    a deicer air jet nozzle located at the boom and operatively coupled to the air outlet of the compressor for receiving air and discharging the air for a deicer application,
    wherein said compressor unit is located at the boom, and
    wherein said compressor unit is disposed above a roof of the vehicle, and
    wherein a power source for said compressor unit is disposed below the roof of the vehicle.

14. A method for deicing aircraft, comprising the steps of:
    compressing air within a compressor supported at the base of a vehicle boom by driving a hydraulic drive assembly coupled to the compressor; and
    discharging the air from a deicer air jet nozzle attached to the end of the vehicle boom such that air is forced outward from the deicer air jet nozzle at about 100 pounds per minute,
    wherein the compressor is disposed above a roof of the vehicle, and wherein a power source for the compressor is disposed below the roof of the vehicle.

15. A system for deicing aircraft, comprising:
a vehicle;
a boom having an end mounted on said vehicle and a free end;
an operator cab located at the free end of said boom; and
a lightweight compressor unit located at said boom,
wherein said deicer air jet nozzle is located at said boom and operatively coupled to the air outlet of said compressor unit for receiving air and discharging the air for a deicer application, and
wherein said compressor unit is disposed above a roof of the vehicle, and
wherein a power source for said compressor unit is disposed below the roof of the vehicle.

16. The system according to claim 15, wherein said compressor unit further comprises:
a hydraulic drive assembly having an output; and
a compressor operatively connected to the output of said hydraulic drive assembly, said compressor having an impeller and an air outlet.

17. The system according to claim 16, wherein said compressor is operatively directly connected to the output of said hydraulic drive assembly.

18. The system according to claim 1, wherein said lightweight air source is a compressor unit comprising:
a compressor operatively connected to the output of a hydraulic drive assembly, said compressor having an impeller and an air outlet.

19. The system according to claim 18, wherein said hydraulic drive assembly is a hydraulic motor.

20. The system according to claim 18, wherein said compressor is a centrifugal compressor.

21. The system according to claim 18, wherein said compressor is operatively directly connected to the output of said hydraulic drive assembly.

22. The system according to claim 18, wherein said compressor provides air through said deicer air jet nozzle at a rate of about 100 pounds per minute.

23. A system for deicing aircraft, comprising:
a vehicle;
a boom having a first end mounted on said vehicle and a free end;
a lightweight compressor unit disposed at the first end of said boom; and
a deicer air jet nozzle located at the boom and operatively coupled to said lightweight compressor unit for receiving air and discharging the air for a deicer application,
wherein said compressor unit further comprises a compressor operatively connected to the output of a hydraulic drive assembly, said compressor having an impeller and an air outlet, and
wherein said compressor unit is disposed above a roof of the vehicle, and
wherein a power source for said compressor unit is disposed below the roof of the vehicle.

24. The system according to claim 23, wherein said compressor is operatively directly connected to the output of said hydraulic drive assembly.

25. The system according to claim 10, wherein said compressor unit further comprises:
a compressor operatively connected to the output of a hydraulic drive assembly, said compressor having an impeller and an air outlet.

26. The system according to claim 25, wherein said compressor is operatively directly connected to the output of said hydraulic drive assembly.

27. A system for deicing, comprising:
a vehicle;
a boom having an end mounted on said vehicle and a free end;
one of (a) a lightweight air source disposed at the base of said boom, wherein said air source is disposed above a roof of the vehicle, and wherein a power source for said air source is disposed below the roof of the vehicle, and (b) a lightweight air source disposed so as to rotate together with said boom in an enclosure connected to said boom; and
a deicer air jet nozzle located at said boom and operatively coupled to said air source for receiving air and discharging the air for a deicer application.

28. The system according to claim 27, wherein said lightweight air source is a compressor unit comprising:
a hydraulic drive assembly having an output; and
a compressor operatively connected to the output of said hydraulic drive assembly, said compressor having an impeller and an air outlet.

29. The system according to claim 28, wherein said hydraulic drive assembly is a hydraulic motor.

30. The system according to claim 28, wherein said compressor is a centrifugal compressor.

31. The system according to claim 28, wherein said compressor is operatively directly connected to the output of said hydraulic drive assembly.

32. The system according to claim 28, wherein said compressor provides air through said deicer air jet nozzle at a rate of about 100 pounds per minute.

33. A system for deicing aircraft, comprising:
a vehicle;
a boom having a first end mounted on said vehicle and a free end;
one of (a) a lightweight compressor unit disposed at the first end of said boom, wherein said lightweight compressor unit is disposed above a roof of the vehicle, and wherein a power source for said lightweight compressor unit is disposed below the roof of the vehicle, and (b) a lightweight compressor unit disposed so as to rotate together with said boom in an enclosure connected to said boom; and
a deicer air jet nozzle located at the boom and operatively coupled to said lightweight compressor unit for receiving air and discharging the air for a deicer application.

34. A system for deicing aircraft, comprising:
a vehicle;
a boom having a first end mounted on said vehicle and a free end;
one of (a) a lightweight compressor unit disposed at the first end of said boom, wherein said lightweight compressor unit is disposed above a roof of the vehicle, and wherein a power source for said lightweight compressor unit is disposed below the roof of the vehicle, and (b) a lightweight compressor unit disposed so as to rotate together with said boom in an enclosure connected to said boom, and
a deicer air jet nozzle located at the boom and operatively coupled to said lightweight compressor unit for receiving air and discharging the air for a deicer application,
wherein said lightweight compressor unit further comprises (a) a hydraulic drive assembly having an output, and (b) a compressor operatively connected to the output of said high-speed drive assembly, said compressor having an impeller and an air outlet.

35. The system according to claim 34, wherein said compressor is operatively directly connected to the output of said hydraulic drive assembly.

36. A system for deicing aircraft, comprising:

a vehicle;

a boom having an end mounted on said vehicle and a free end;

an operator cab located at the free end of said boom;

one of (a) a lightweight compressor unit disposed at the base of said boom, wherein said compressor unit is disposed above a roof of the vehicle, and wherein a power source for said compressor unit is disposed below the roof of the vehicle, and (b) a lightweight compressor unit disposed so as to rotate together with said boom in an enclosure connected to said boom; and a deicer air jet nozzle located at said boom and operatively coupled to the air outlet of said compressor unit for receiving air and discharging the air for a deicer application,

37. The system according to claim 36, wherein said compressor unit further comprises:

a hydraulic drive assembly having an output; and a compressor operatively connected to the output of said hydraulic drive assembly, said compressor having an impeller and an air outlet.

38. The system according to claim 37, wherein said compressor is operatively directly connected to the output of said hydraulic drive assembly.

39. A system for deicing aircraft, comprising:

a vehicle;

a boom, having an end mounted on the vehicle and a free end;

a compressor unit, said compressor unit comprising (a) a hydraulic motor having an output, and (b) a compressor operatively connected to the output of said hydraulic motor, said compressor having an impeller and an air outlet; and a deicer air jet nozzle located at the boom and operatively coupled to the air outlet of the compressor for receiving air and discharging the air for a deicer application, wherein one of the following conditions is satisfied (a) said compressor unit is located at the boom, said compressor unit is disposed above a roof of the vehicle, and a power source for said compressor unit is disposed below the roof of the vehicle, and (b) wherein said compressor unit is located so as to rotate together with the boom in an enclosure connected to said boom.

40. A method for deicing aircraft, comprising the steps of:

one of (a) compressing air within a compressor supported at the base of a vehicle boom by driving a hydraulic drive assembly coupled to the compressor, wherein the compressor is disposed above a roof of the vehicle, and wherein a power source for the compressor is disposed below the roof of the vehicle, and (b) compressing air within a compressor, supported so as to rotate together with a vehicle boom in an enclosure connected to the vehicle boom, by driving a hydraulic drive assembly coupled to the compressor; and discharging the air from a deicer air jet nozzle attached to the end of the vehicle boom such that air is forced outward from the deicer air jet nozzle at about 100 pounds per minute.

41. A system for deicing aircraft, comprising:

a vehicle;

a boom having an end mounted on said vehicle and a free end;

an operator cab located at the free end of said boom; and one of (a) a lightweight compressor unit located at said boom, wherein said compressor unit is disposed above a roof of the vehicle, and wherein a power source for said compressor unit is disposed below the roof of the vehicle, and (b) a lightweight compressor unit located so as to rotate together with said boom in an enclosure connected to said boom, wherein said deicer air jet nozzle is located at said boom and operatively coupled to the air outlet of said compressor unit for receiving air and discharging the air for a deicer application.

42. The system according to claim 41, wherein said compressor unit further comprises:

a hydraulic drive assembly having an output; and a compressor operatively connected to the output of said hydraulic drive assembly, said compressor having an impeller and an air outlet.

43. The system according to claim 42, wherein said compressor is operatively directly connected to the output of said hydraulic drive assembly.

44. The system according to claim 27, wherein said lightweight air source is a compressor unit comprising:

a compressor operatively connected to the output of a hydraulic drive assembly, said compressor having an impeller and an air outlet.

45. The system according to claim 44, wherein said hydraulic drive assembly is a hydraulic motor.

46. The system according to claim 44, wherein said compressor is a centrifugal compressor.

47. The system according to claim 44, wherein said compressor is operatively directly connected to the output of said hydraulic drive assembly.

48. The system according to claim 44, wherein said compressor provides air through said deicer air jet nozzle at a rate of about 100 pounds per minute.

49. A system for deicing aircraft, comprising:

a vehicle;

a boom having a first end mounted on said vehicle and a free end;

one of (a) a lightweight compressor unit disposed at the first end of said boom, wherein said compressor unit is disposed above a roof of the vehicle, and wherein a power source for said compressor unit is disposed below the roof of the vehicle, and (b) a lightweight compressor unit disposed so as to rotate together with said boom in an enclosure connected to said boom; and a deicer air jet nozzle located at the boom and operatively coupled to said lightweight compressor unit for receiving air and discharging the air for a deicer application, wherein said compressor unit further comprises a compressor operatively connected to the output of a hydraulic drive assembly, said compressor having an impeller and an air outlet.

50. The system according to claim 49, wherein said compressor is operatively directly connected to the output of said hydraulic drive assembly.

51. The system according to claim 36, wherein said compressor unit further comprises:
a compressor operatively connected to the output of a hydraulic drive assembly, said compressor having an impeller and an air outlet.

52. The system according to claim 51, wherein said compressor is operatively directly connected to the output of said hydraulic drive assembly.

53. A method for deicing aircraft, comprising the steps of:
compressing air within a compressor, an enclosure for which is connected to a vehicle boom, by driving a hydraulic drive assembly coupled to the compressor; and
discharging the air from a deicer air jet nozzle attached to the end of the vehicle boom such that air is forced outward from the deicer air jet nozzle at about 100 pounds per minute,
wherein the compressor is disposed above a roof of the vehicle, and
wherein a power source for the compressor is disposed below the roof of the vehicle.

\* \* \* \* \*